Aug. 22, 1961
M. CHRUNEY ET AL
2,997,619
BEAM POSITIONING TUBE
Filed March 24, 1960
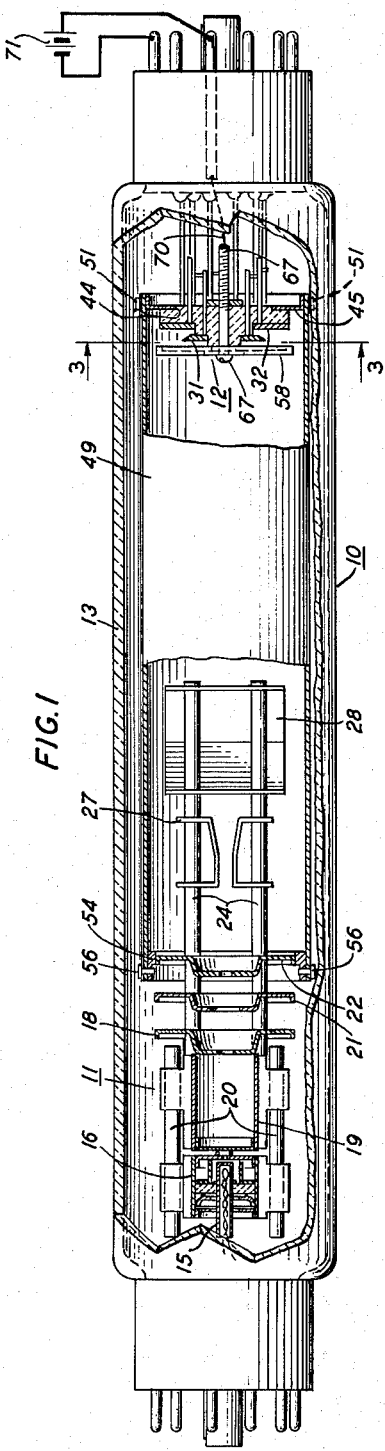
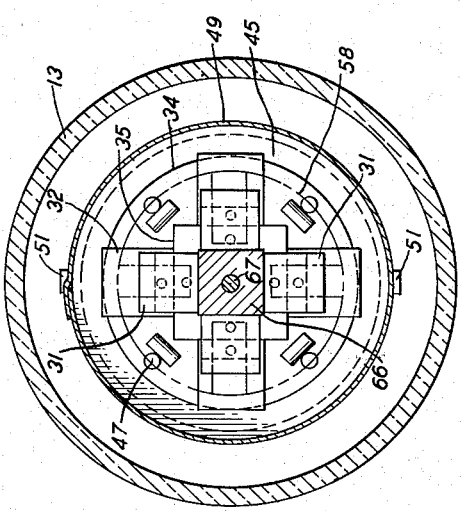
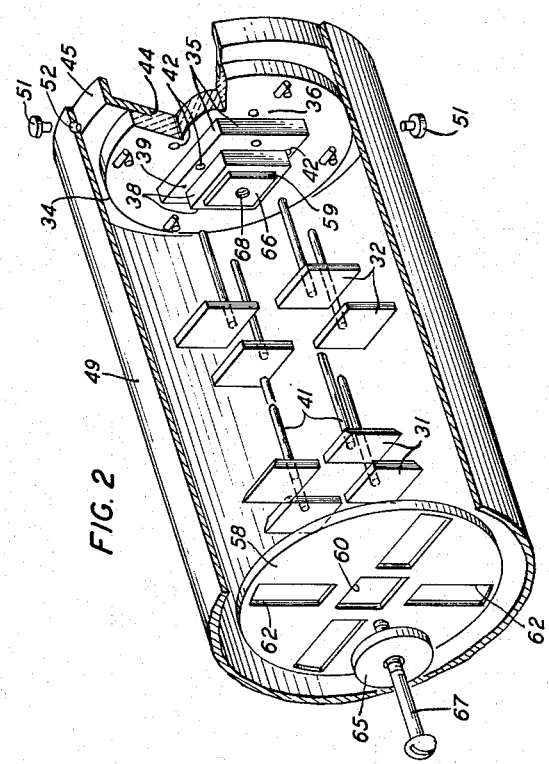
INVENTORS
M. CHRUNEY
H. W. ERICSSON, Sr.
J. A. McCARTHY
BY
ATTORNEY

United States Patent Office 2,997,619
Patented Aug. 22, 1961

2,997,619
BEAM POSITIONING TUBE
Michael Chruney, Berkeley Heights, Harry W. Ericsson, Sr., Fanwood, and John A. McCarthy, Morristown, N.J., assignors to Bell Telephone Laboratories, Incorporated, New York, N.Y., a corporation of New York
Filed Mar. 24, 1960, Ser. No. 17,333
8 Claims. (Cl. 315—21)

This invention relates to electron discharge apparatus and more particularly to target structures for beam positioning tubes.

For many various applications, notably in certain information storage systems, it is desirable to make use of cathode ray tubes which have beam deflection characteristics that are extremely accurate. To insure the accurate positions of the beams of such tubes, separate electron beam control systems are sometimes used. One such control system is disclosed in the patent of C. F. Ault 2,904,721 issued September 15, 1959.

The control system disclosed in the Ault patent comprises a beam positioning tube that controls the beam position of other cathode ray tubes which are coupled thereto. The beam positioning tube comprises an electron gun and four pairs of flat target electrodes in quadrature. One electrode of each pair is overlapped over the other electrode so that when the electron beam is deflected to an extreme position in any of four directions, it will impinge equally on both electrodes of a pair. If the beam does not impinge equally on both electrodes of a given pair, a correction current is fed back to the deflection system of the electron gun to correct the position of the beam. The deflection system of the beam positioning tube is coupled to the deflection systems of other cathode ray tubes so that the accurate positions of the beams of these tubes are maintained.

Although the above-described beam control system has proven to be successful, certain mechanical problems in the construction of the beam positioning tube are apparent. Since the beam positioning tube measures beam deflection from the tube axis, the foremost of these problems is the precise positioning of the various target electrodes with respect to the tube axis. If the exposed edge of the overlapping electrode of a pair is not at the proper predetermined distance from the tube axis, a properly deflected beam will impinge unequally on the two electrodes and a fallacious correction current will be produced. Various errors in assembly may result in improper positioning of the exposed edge. For example, if any of the flat target electrodes are not precisely transverse to the tube axis, or, in other words, are tilted toward or away from the electron gun, unequal impingement by a properly deflected beam will result. Further, the exposed edge must be precisely perpendicular to the tube axis. If the exposed edge of the overlapping electrode of a pair is tilted to one side or the other, false correction currents may be produced.

The electron gun must, of course, be in precise alignment with respect to the four pairs of electrodes. The proper positioning of the electron gun within the tube has proven to be quite difficult because the only reference structure from which the appropriate measurements can be taken is the tube envelope. Also, any jarring of the electron gun after assembly is apt to disturb this precise alignment.

Another problem which arises is the high electron beam power necessary to produce an appropriately high correction current. In order to reduce this power requirement, the target electrodes are coated with a material having a high secondary emission ratio. Therefore, upon impingement, a greater number of electrons leave the target than impinge it, and the quantity of current produced by the electron beam is effectively multiplied. It has been found, however, that this operation can be more harmful than helpful if many of the secondarily emitted electrons impinge upon other target electrodes. Such spurious impingement produces incorrect control currents with resultant malfunctioning of the entire control system.

The aforementioned problems are effectively multiplied when one considers the severe physical shocks and stresses to which a beam positioning tube is often exposed. An extraneous force on any of the target electrodes or the electron gun may cause misalignment to the point of inoperativeness. Further, the various tube elements and particularly the target electrodes are subject to severe thermal stresses. The target electrodes are supported by conductive support rods which should theoretically expand and contract to the same degree. In practice, however, differential expansion and contraction can occur between the various support rods with resulting misalignment of certain target electrodes. It is therefore necessary that the tube not only function accurately, but also that it be rugged enough to withstand severe shocks and stresses.

It is, therefore, an object of this invention to provide a sturdy mount for four pairs of overlapping target electrodes in a beam positioning tube and to insure proper alignment of these target electrodes with respect to each other.

It is another object of this invention to insure proper alignment, even under conditions of severe shock and stress, between an electron gun and the target electrodes of a beam positioning tube.

It is still another object of this invention to prevent undesired impingement of secondary electrons on the target electrodes of a beam positioning tube.

These and other objects of our invention are attained in one illustrative embodiment thereof comprising an electron gun having vertical and horizontal deflection plates. The gun is located at one end of an evacuated envelope and comprises a cathode, a focusing electrode and a plurality of annular accelerating electrodes. Located at the opposite end of the envelope are four pairs of target electrodes arranged in quadrature. One target electrode of each pair overlaps the other so that the electron beam, at a certain predetermined position, impinges each electrode of a pair equally.

It is a feature of this invention that the target electrodes be mounted on a stepped ceramic mounting member. By mounting the target electrodes flush within the steps of such a member, the correct relative positions of these electrodes are automatically obtained, thus minimizing assembly problems. Further, these relative positions are maintained even under conditions of severe physical stress.

It should be pointed out that the ceramic mounting member itself is susceptible to mass-production techniques, even under the most stringent tolerance requirements. Therefore a large quantity of mounting members can be manufactured with a minimum expenditure of manual effort. Once the mounting members have been made available, a large number of target structures can be assembled quickly with very little manual facility, while still attaining precise relative alignments of the various individual target electrodes.

It is another feature of this invention that a cylindrical shield is connected to both the ceramic mounting member and the electron gun. By this arrangement, the shield serves the dual purpose of preventing electrostatic charging of the tube envelope and also keeping the target structures and the electron gun in alignment. For example, if the electron gun is jarred slightly, the mounting member will also be jarred because it is rigidly connected by the shield can to the electron gun. Therefore, the correct alignment between the gun and the targets will be maintained.

It is another feature of this invention that cylindrical flanges of equal outside diameter enclose both the ceramic mounting member and one of the accelerating electrodes. The diameters of these flanges are equal to the inside diameter of the cylindrical shield can. In accordance with this feature, the mounting member is conveniently secured within one end of the shield can and the electron gun is secured within the opposite end. The flanges and the shield have corresponding predrilled holes that can be aligned manually. When pins are inserted therethrough, the gun and target structures are locked together in correct alignment. The flanges are then welded to the shield can to insure that this correct alignment is maintained.

It is still another feature of this invention that an apertured shield be secured to one of the steps of the mounting member between the electron gun and the target electrodes. The apertures of the shield permit the beam to impinge on the target electrode, but prohibit beam impingement on the ceramic mounting member. Such undesired impingement on the mounting would produce an electrostatic charge thereon which might seriously impair tube operation. The apertured shield is biased positively to perform the additional function of collecting secondary electrons from the target electrodes. This prevents secondarily emitted electrons from impinging on any of the target electrodes; such spurious impingement would produce a fallacious correction current. Further, the correct position of the apertured shield is maintained because it is mounted flush with one of the steps of the mounting member.

These and other features of our invention will become more clearly understood upon consideration of the following detailed description, taken in conjunction with the drawing in which:

FIG. 1 is a sectional view of a beam positioning tube embodying the principles of this invention;

FIG. 2 is an exploded view of the target structure of FIG. 1; and

FIG. 3 is a sectional view taken along lines 3—3 of FIG. 1.

Referring now to FIG. 1 there is shown a beam positioning tube 10 comprising an electron gun 11 and a target structure 12 located at opposite ends of an evacuated envelope 13. Envelope 13 is constructed of glass or any of various other suitable materials.

Electron gun 11 is of a general type that is known in the art. For purposes of illustration it is shown as comprising a cathode 15 enclosed within a grid can 16. An accelerating electrode 18 is electrically connected to an accelerating cylinder 19 which is positioned adjacent the grid can. Grid can 16 and accelerating cylinder 19 are mounted on support rods 20. Downstream from accelerating electrode 18 is a focusing electrode 21. Adjacent the focusing electrode is a second accelerating electrode 22. For many types of operation accelerating electrodes 18 and 22 may be electrically connected. Rigidly attached to support rods 24 are vertical deflection plates 27 and horizontal deflection plates 28, the purposes of which are well known.

Target structure 12 comprises four inner target electrodes 31 and four outer target electrodes 32 as can be best seen in FIGS. 2 and 3. These electrodes are arranged in pairs, the inner electrode of each pair overlapping the outer electrodes. The overlapping edge of each of the inner electrodes is sharply beveled to a knife-edge, thereby providing a distinct demarcation between the two electrodes of a pair. In operation the electron beam is periodically deflected to impinge successively the knife-edges of each of the inner electrodes. Equal beam impingement on the inner and outer target electrodes of each pair represents correct beam position and correct angular deflection. If the beam drifts, or if incorrect deflection occurs, impingement on the two electrodes of one or more pairs will be unequal and an appropriate correction current will be fed back to the deflection plates 27 and 28. A general explanation of the operation of a tube such as tube 10 and a detailed description of the feedback circuit is given in the aforementioned Ault patent.

In accordance with our invention, the target electrodes are rigidly secured to a stepped mounting member 34 of insulating material such as ceramic. As best seen in FIG. 2, outer target electrodes 32 are mounted flush with walls 35 and 36 of the mounting member. Inner target electrodes 31 are mounted flush with walls 38 and 39. Lead wires 41 are rigidly connected to the target electrodes, as by brazing, and extend through predrilled holes 42 of the mounting member. Lead wires 41 serve both as transmission lines and also as means for securing the target electrodes to the mounting member.

As can be appreciated from FIG. 2, accurate assembly of the target electrodes in accordance with our invention is very expeditious. By mounting the outer and inner target electrodes flush against walls 36 and 39, respectively, any forward or backward tilt of the target electrodes with respect to the electron gun is prohibited. Likewise, mounting the electrodes flush with walls 38 or 35 prevents any deleterious side-to-side tilt. Further, after the tube is assembled, no jarring or stresses upon lead wires 41 will impair the alignment of the target electrodes because of the unique construction of the mounting member.

On the mounting member 34, opposite target electrodes 31 and 32, is a cylindrical step 44 for supporting a flange 45. Flange 45 is annular and is conveniently fitted over step 44 during assembly. As seen in FIG. 3, support wires 47 extend through mounting member 34 to secure rigidly flange 45 thereto. A shield can 49 is fitted over flange 45. Pins 51 are fitted through predrilled holes 52 in the shield can and flange to insure a proper angular position of the shield can with respect to the flange. In a like manner, shield can 49 is secured at its opposite end to an insulator flange 54 which surrounds accelerating electrode 22 of electron gun 11. When pins 56 are inserted through predrilled holes in the shield can and insulator flange 54, the correct predetermined angular position of the shield can with respect to the electron gun 11 is effected. After insertion of the pins, the shield can is secured to the flanges along other portions of its periphery as by spot-welding.

From the foregoing it can be appreciated that shield can 49 serves to insure proper alignment between the electron gun 11 and the target electrodes 31 and 32. Further, it is made of conductive material and shields envelope 13 from being impinged by stray electrons or ions. If envelope 13 did receive an electrostatic charge, the electron beam might be deleteriously deflected from its intended trajectory.

Likewise, it is advantageous to prevent electrostatic charging of mounting member 34. To this end an apertured shield 58 is secured to mounting member 34 as is best seen in FIG. 1. Shield 58 is mounted on step 59 of mounting member 34 by means of a square aperture 60 within the shield as seen in FIG. 2. Apertures 62 permit beam impingement on the target electrodes 31 and 32, but the shield itself prohibits beam impingement on the mounting member 34. Shield 58 is symmetrical and the protrusion of step 59 through square aperture 60 insures correct alignment of apertures 62 with respect to the target electrodes. A washer 65 is fitted over aperture 60 to prevent electrostatic charging of the mounting member due to accidental beam impingement on wall 66 of step 59. A bolt 67 is screwed through a threaded aperture 68 to secure firmly shield 58 and washer 65 to the mounting member 34. Bolt 67 also serves to transmit current from shield 58 as will be explained hereinafter.

Experiment has shown that the current generated in lead wires 41 as a result of beam impingement on targets 31 and 32 is sometimes insufficient to produce a correction current of appropriately high power. To increase the current generated by beam impingement, target electrodes 31 and 32 are coated with a material having a high ratio of secondary emission, such as aluminum oxide. For example, if the secondary emission ratio is 3:1, three electrons will leave a target electrode for every electron that impinges thereon, and the net current thereby generated will be effectively doubled.

To protect against spurious impingement of the secondarily emitted electrons on the target electrodes, and undesired electrostatic charging of the mounting member, some provision should be made for collecting the secondary electrons. This is accomplished by biasing shield 58 positively with respect to target electrodes 31 and 32. As seen in FIG. 1 this is done by connecting bolt 67 to lead wire 70. Lead wire 70 is connected by a pin connection to a voltage source 71 which maintains it at an appropriately high positive potential; since none of the other voltage sources or external circuitry comprise part of the present invention, they have not been shown.

From the foregoing it can be appreciated that, in accordance with the features of our invention, a rugged dependable beam positioning tube can be assembled with very little mechanical skill or precision. The stepped mounting member 34 inherently assures correct alignment between the various target electrodes. The shield can 49 not only prevents electrostatic charging of the envelope 13 but also inherently insures correct alignment between the electron gun 11 and the target structure 12. Apertured shield 58 performs the dual function of preventing electrostatic charging of the mounting member and also collecting secondary electrons. Step 59 of the mounting member insures a correct alignment of shield 58. All of these structures cooperate to give a practicable beam positioning tube which is easily assembled, which can withstand severe stresses and shocks, and which functions accurately to the most exacting tolerances.

It is to be understood that the foregoing embodiment is merely illustrative of the application of the principles of the present invention. Numerous other arrangements may be devised by those skilled in the art without departing from the spirit and scope of this invention.

What is claimed is:

1. A beam positioning tube comprising electron gun means for forming and projecting an electron beam, a first annular flange rigidly surrounding a portion of said electron gun, a target electrode mounting member having a plurality of steps, a second annular flange having the same outer diameter as the outer diameter of said first annular flange and rigidly surrounding a portion of said mounting member, a hollow cylindrical shield can having substantially the same inner diameter as the outer diameters of said first and second flanges, one end of said shield can being rigidly attached to said first flange and the other end of said shield can being rigidly attached to said second flange, an apertured shield mounted on a first of the steps of said mounting member, a first array of four flat target elements mounted in quadrature on a second of the steps of said mounting member, a second array of four flat target elements mounted in quadrature on a third of the steps of said mounting member, and means for biasing said apertured shield positively with respect to said target elements.

2. A target structure for a beam positioning tube comprising a ceramic mounting member having first, second and third steps on one side thereof and a fourth step on the opposite side, an apertured shield mounted on said first step, a first array of four flat target electrodes mounted in quadrature on said second step, a second array of four flat target electrodes mounted in quadrature on said third step, said first target electrodes partially overlapping said second target electrodes, an annular flange mounted on said fourth step, and a cylindrical shield member connected to said flange and encompassing said mounting member.

3. A target structure for a beam positioning tube comprising a ceramic member having a plurality of steps, a first array of four flat target elements mounted in quadrature on a first of the steps of said member, a second array of four flat target elements mounted in quadrature on a second of the steps of said member, said second target elements partially overlapping said first target elements, means for preventing electrostatic charging of said ceramic member and for collecting secondary electrons which are emitted from said target elements, said means comprising a conductive plate mounted on a third of the steps of said ceramic member and having apertures therein only over portions of overlapping first and second target elements, a conductive annular flange, means extending through said first step of said ceramic member intermediate said first target elements for mounting said flange to said ceramic member, and a cylindrical shield can connected to said flange and encompassing said ceramic member.

4. A cathode ray device comprising an elongated envelope, an electron gun at one end of said envelope, a target structure at the other end of said envelope, said gun having a first cylindrical portion, said target structure having a second cylindrical portion of the same diameter as said first cylindrical portion, means for preventing electrostatic charging of said envelope and for aligning said target structure with respect to said gun, said last-mentioned means comprising a hollow cylindrical shield, means for securing said first cylindrical portion within one end of said shield can, means for securing said second cylindrical portion within the other end of said shield can, said target structure comprising a plurality of target electrodes having a high ratio of secondary emission, means for mounting said target electrodes comprising a stepped mounting member of insulating material, means for preventing electrostatic charging of said mounting member and for collecting secondary electrons comprising a conductive plate having therein four apertures arranged in quadrature, said conductive plate being mounted on a step of said stepped mounting member and being located between said target electrodes and said electron gun, and means for biasing said conductive plate positively with respect to said target electrodes.

5. A target structure for a beam positioning tube comprising a first array of flat rectangular target electrodes arranged in a first plane, a second array of flat rectangular target electrodes arranged in a second plane, said first array partially overlapping said second array, conductors secured to and extending from each of said target electrodes, means for constraining angular movement of said first array of electrodes comprising a first wall abutting against said first array of electrodes and transverse to said first plane, means for constraining said first array of target electrodes to remain in said first plane comprising a second wall abutting against said first array of electrodes and parallel to said first plane, means for constraining angular movement of said second array of target electrodes comprising a third wall abutting against second array of electrodes and transverse to said second plane, means for constraining said second array of electrodes to remain in said second plane comprising a fourth wall abutting against said second array of electrodes and parallel to said second plane, the conductors secured to said first array of electrodes extending through said second wall, the conductors secured to said second array of electrodes extending through said fourth wall, and means adjacent said first array for preventing electrostatic charging of said walls.

6. A target structure for an electron beam device comprising a mounting member having first, second, third and fourth vertical walls on one side thereof, a first step interconnecting said first and second vertical walls, a second step interconnecting said second and third vertical walls, a third step interconnecting said third and fourth vertical walls, the other side of said mounting member having fifth and sixth vertical walls, a fourth step interconnecting said fifth and sixth vertical walls, a first array of target elements mounted flush with said third step and said fourth vertical wall, a second array of target elements mounted flush with said second step and said third vertical wall, said second array partially overlapping said first array, an apertured shield mounted flush with said first step and said second vertical wall, the positions of the apertures in said shield corresponding with the positions at which said first array overlaps said second array, a washer mounted flush with said apertured shield by means of a rod extending through said first wall, and an annular flange mounted flush with said fourth step and said fifth vertical wall.

7. A cathode ray device comprising an elongated envelope, electron gun means for forming and projecting an electron beam, said electron gun means comprising a cathode, a cylindrical accelerating electrode and vertical and horizontal deflection plates, means for detecting error in vertical deflection comprising two pairs of flat target electrodes in the vertical coordinate of said ray device, means for detecting error in horizontal deflection comprising two pairs of flat target electrodes in the horizontal coordinate of said ray device, one target electrode of each of said pairs partially overlapping the other, means for mounting said target electrodes, said mounting means having a cylindrical periphery, means for preventing electrostatic charging of said envelope and for aligning said target electrodes with respect to said electron gun comprising a hollow cylindrical shield can, said cylindrical accelerating electrode being secured within one end of said shield can and said cylindrical mounting member being secured within the other end of said shield can, means for shielding said mounting member and for collecting secondary electrons which are emitted from said target electrodes comprising a flat conductive plate secured to said mounting member and between said target electrodes and said electron gun, said plate having two apertures extending along said vertical coordinate and two apertures extending along said horizontal coordinate.

8. The cathode ray device of claim 7 wherein one side of said mounting member has the shape of a stepped pyramid, said conductive plate having an angular central aperture of the same configuration as the uppermost step of said mounting member, the uppermost step of said mounting member being closely fitted within said central aperture, all of said overlapping target electrodes being mounted within the vertex of an intermediate step of said mounting member, all of the overlapped target electrodes being mounted within the vertex of the lowermost step of said mounting member, a bolt in electrical contact with said conductive plate and extending through the center of said mounting member, and means for biasing said bolt positively with respect to said target electrodes.

References Cited in the file of this patent

UNITED STATES PATENTS

| | | |
|---|---|---|
| 2,540,835 | Anderson | Feb. 6, 1951 |
| 2,666,162 | Hollway et al. | Jan. 12, 1954 |
| 2,904,721 | Ault | Sept. 15, 1959 |